Oct. 23, 1923.

F. GELSTHARP 1,471,725

PROCESS AND APPARATUS FOR PRODUCING SPECTACLE BLANKS

Filed Aug. 30, 1920     4 Sheets-Sheet 3

INVENTOR
Frederick Gelstharp
by
James C. Bradley

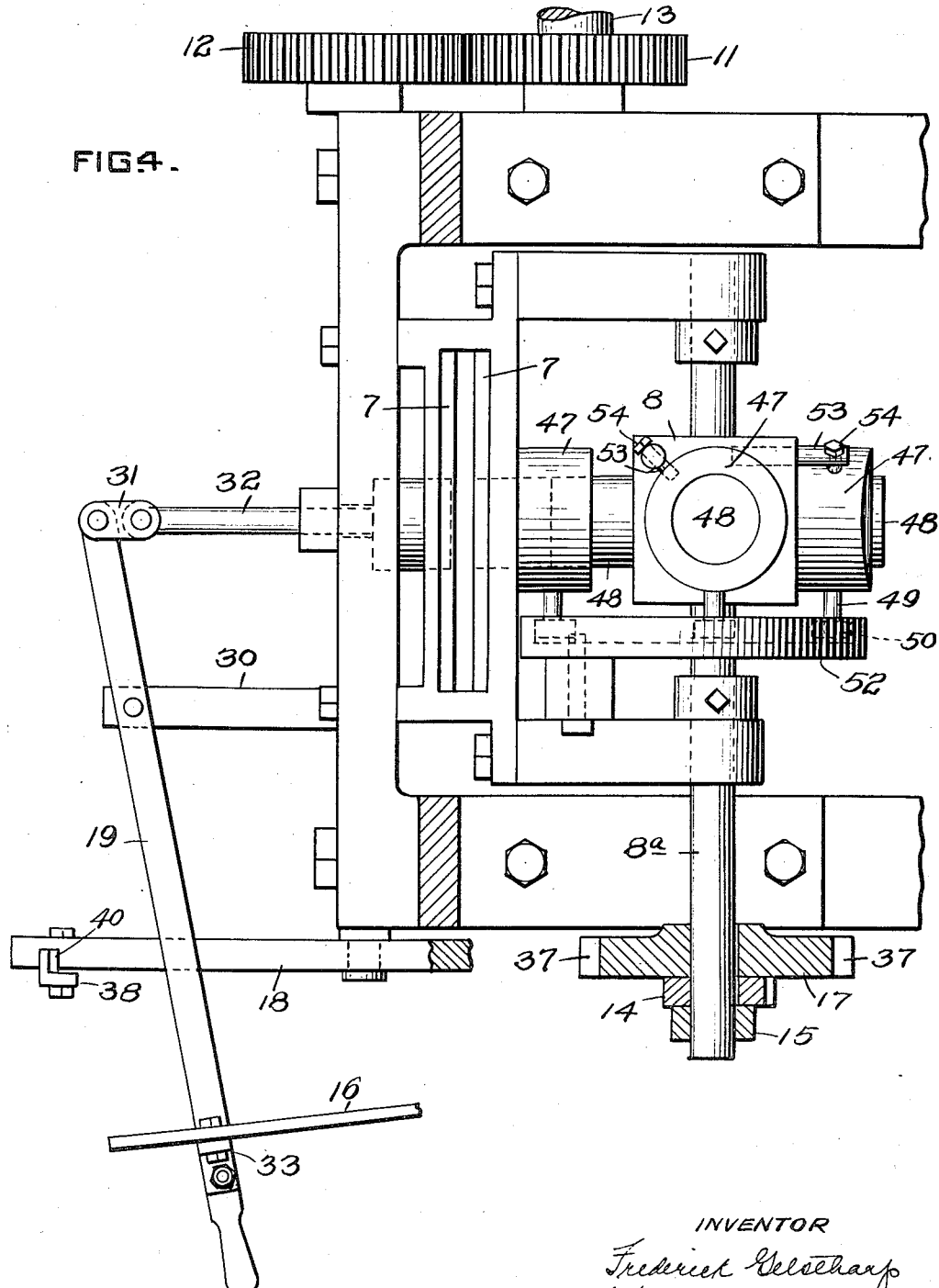

Patented Oct. 23, 1923.

1,471,725

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

PROCESS AND APPARATUS FOR PRODUCING SPECTACLE BLANKS.

Application filed August 30, 1920. Serial No. 407,014.

*To all whom it may concern:*

Be it known that I, FREDERICK GELSTHARP, a citizen of Great Britain, and a resident of Tarentum, in the county of Allegheny and State of Pennsylvania, have made a new and useful Invention in Processes and Apparatus for Producing Spectacle Blanks, of which the following is a specification.

Figure 1:
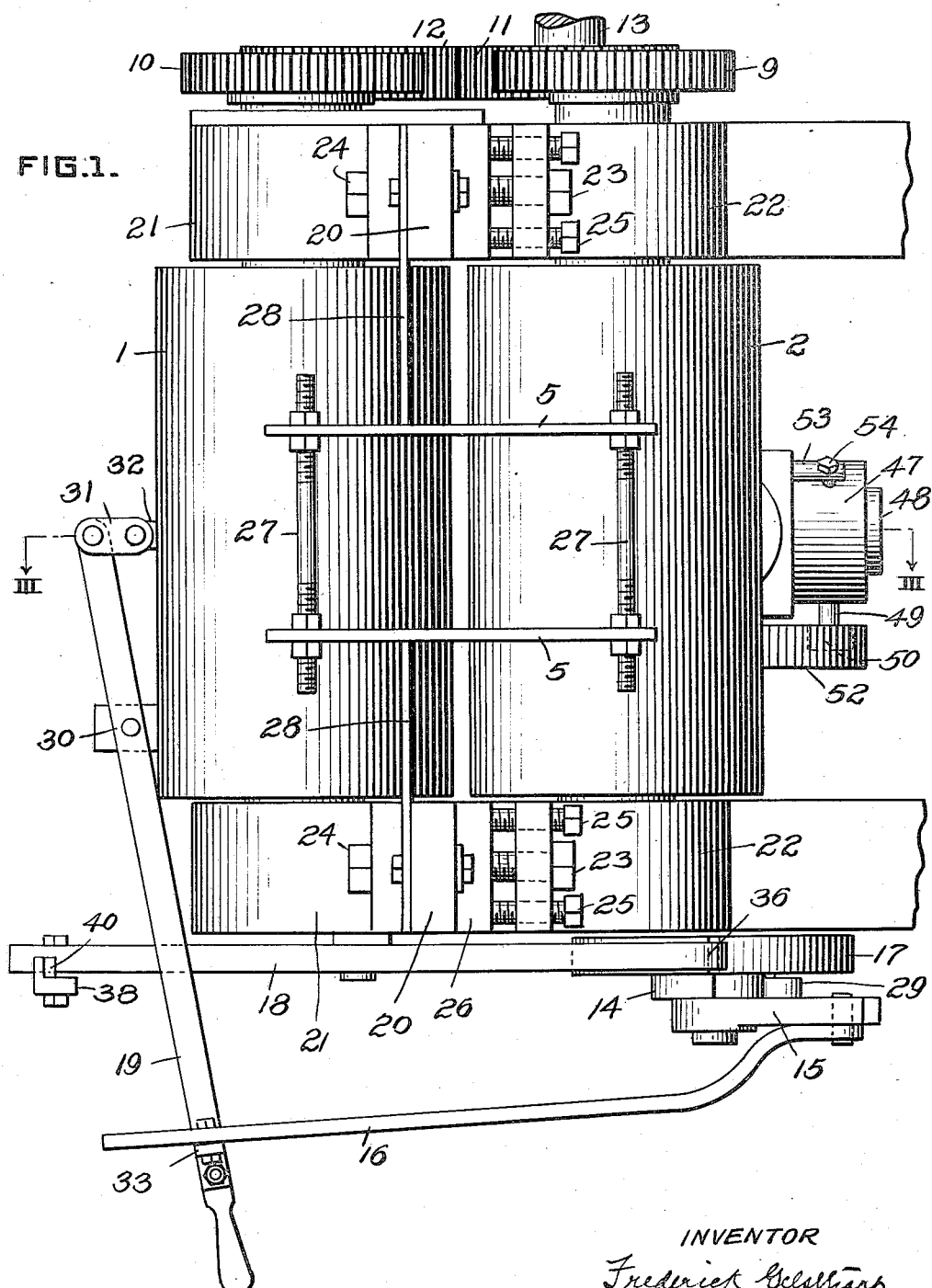
Figure 2:
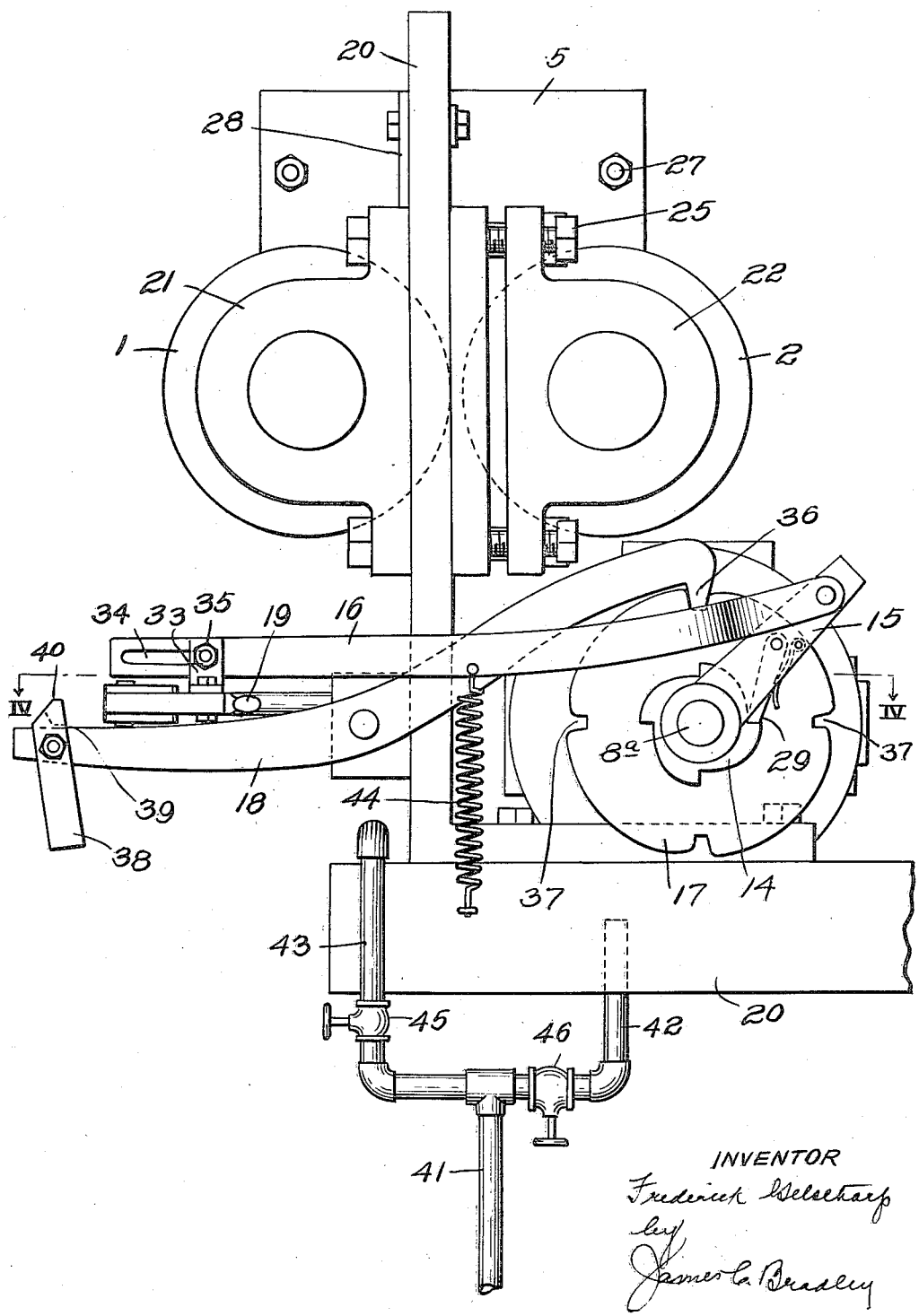
Figure 3:
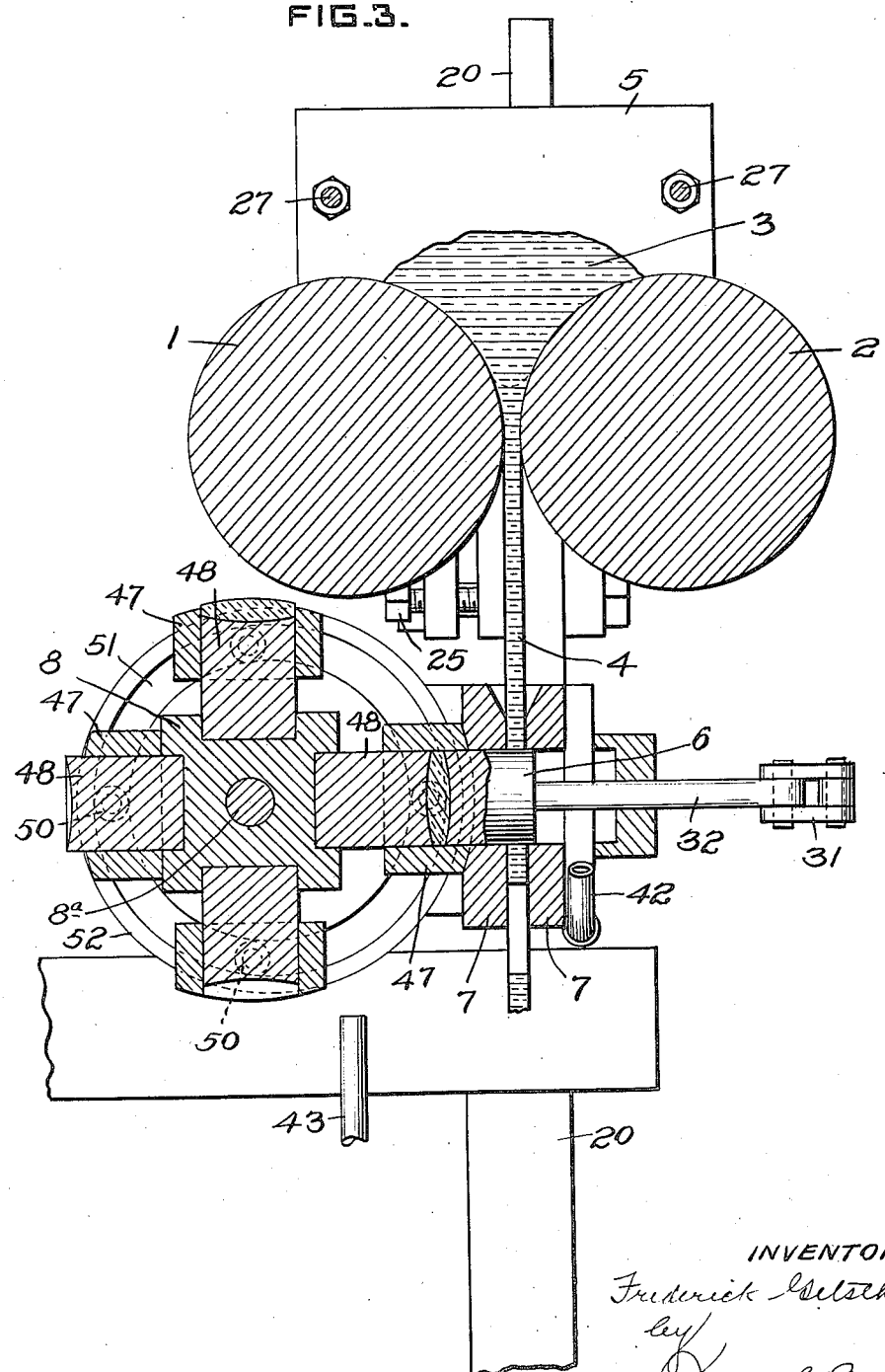

The invention relates to a process and apparatus for producing spectacle blanks. It has for its principal objects the provision of an improved process and apparatus, (1) whereby the blanks may be produced more rapidly and economically than by the methods heretofore practiced, (2) whereby the blanks may be punched from a glass sheet in a plastic state and pressed to the desired curvature at a single operation, and (3) in which the blanks may be produced continuously with a minimum amount of waste and with a relatively high percentage of usable blanks. One embodiment of the invention is illustrated in the accompanying drawings, wherein:

Figure 1 is a plan view of the apparatus. Fig. 2 is an end elevation. Fig. 3 is a vertical section on the line III—III of Fig. 1, and Fig. 4 is a horizontal section on the line IV—IV of Fig. 2.

Briefly stated, the machine comprises in its preferred form a pair of horizontal rolls between which a mass of glass is placed and rolled downwardly in the form of a sheet in combination with a plunger which moves transversely of the sheet and punches out successive blanks, such blanks being carried laterally by the plunger and pressed into molds having the desired configuration, so that a complete blank is formed at a single operation and without the necessity of reheating the glass or cutting it. The mold which is preferably used comprises a rotating drum having a series of recesses in its periphery which recesses are brought successively into alignment with the plunger. Suitable provision is made for timing the movement of the plunger and the drum and the drum is equipped with release mechanism so that the blanks are automatically released from the recesses at one point in its rotation. The particular machine illustrated is relatively small and simple with a relatively limited production. It will be understood that the invention may be embodied in a much larger machine with a correspondingly greater production.

Referring first to the general arrangement of the apparatus, the principal parts may be enumerated as follows: 1 and 2 are the rolls for generating the mass of glass 3 into the depending sheet 4; 5—5 are spaced plates fitting between the rolls for confining the mass of glass 3 against endwise movement; 6 is the plunger for punching out the blanks; 7—7 are a pair of plates providing a passageway for the sheet and adapted to support it during the punching operation; 8 is a drum mounted for rotation opposite the plunger and provided with a series of blank receiving recesses into which the blanks are pressed by the plunger 6; 9 and 10 are spur gears mounted upon the ends of the rolls 1 and 2, by means of which they are rotated (Fig. 1); 11 and 12 are a pair of intermeshing spur gears which also mesh respectively with the gears 9 and 10 and constitute driving means therefor, the gear 11 being driven from the shaft 13 from suitable power mechanism (not shown); 14 (Fig. 2) is a ratchet carried by the drum 8 and by means of which it is intermittently rotated from the levers 15 and 16; 17 is a stop plate for holding the drum aligned in its successive positions, such plate being provided with suitable notches successively engaged by the lever 18, and 19 is a handle co-operating with the lever 16 for giving the mold drum its intermittent rotation and for operating the plunger 6 between the successive movements of rotation of the drum.

The mechanism is carried by a suitable framework 20 and the rolls 1 and 2 are mounted in bearing members 21 and 22, the members 22 being adjustable so that the thickness of the sheet of glass may be regulated to meet varying conditions. This adjustment is accomplished by means of the bolts 23 provided with the nuts 24 (Fig. 1) in connection with the stud bolts 25 which bear at their ends on the plate 26 carried by the framework, so that the bearing members 22 are securely locked against movement. The plates 5 for confining the mass of molten glass between the rolls are also made adjustable by the use of the bolts 27, and this device is held in position by means of plates 28 (Fig. 1) which extend inwardly from the frame members 20 to which they are bolted.

The intermittent rotation of the drum is accomplished from the lever 16 operated by the handle 19, the lever 16 being pivoted at its outer end to the lever 15, which in turn carries the pawl 29 adapted to engage the teeth of the ratchet member 14. The lever 19 also serves to operate the plunger 6 which punches out the blanks, such lever 19 being pivoted to the framework at 30 and at its inner end to the link 31, which is in turn pivoted to the rod 32, which carries the plunger 6. The lever or handle 19 is pivoted to the lever 16 by means of the bracket 33. It will be seen therefore that as the handle moves in one direction, it moves the plunger 6 inward to punch out a blank, the drum at such time being at rest, while on its reverse movement it withdraws the plunger, and after such withdrawal rotates the drum 90° to bring another recess on the drum into alignment with the plunger. Since the plunger must be withdrawn from the mold recess before the drum can turn, a lost motion connection between the bracket 33 carried by the handle and the lever 16 is necessary, and this connection is supplied by providing the slot 34 in the lever, which slot is engaged by the bolt 35 carried by the bracket.

The stop device for holding the drum in proper position comprises the lever 18 having the nose 36 for engaging the recesses 37 in the plate 17, such plate being secured so as to rotate with the drum. This device is also operated by the movement of the handle 19. In order to accomplish this result at the proper time, the dog 38 is pivoted upon the end of the lever 18, such dog being provided with a stop 39 which permits the upper end of the drum to move to the left from the position shown but prevents it from swinging to the right. When the handle 19 is moving to the right it passes the dog without moving the lever 18. On the return movement of the handle the cam face 40 of the dog is engaged by the handle, thus camming the left hand end of the lever 18 downward and disengaging the nose 36 from the notch 37 of the locking plate. During this return movement of the handle the lost motion connection 34—35 again comes into play as it is necessary that the nose 36 should be released from the locking plate before the handle commences to move the lever 16. After the lever has passed the dog the lever 18 is pulled down again by means of the spring 44, the nose of the lever at this time resting upon the edge of the locking plate 17 until the rotation of the drum brings the plate in position for another operation of the punching plunger at which time the nose 36 drops into the next recess 37 in the locking plate.

In order to bring the plunger 6 and drum 8 to the proper temperature at the beginning of the operation the burners 42 and 43 are employed (Fig. 3), such burners being connected to the gas supply pipe 41 and the flow controlled by the valves 45 and 46 (Fig. 2). After the plunger and drum have been operated for a certain period the glass itself will supply sufficient heat to keep the parts at the proper temperature and the gas supply may be reduced or cut off entirely, depending upon requirements.

In order to provide for the release of the blanks which have been formed in the recesses of the drum, the movable rings 47 are employed upon the drum. These rings are mounted for reciprocation upon the parts 48 and are provided with laterally extending studs 49, carrying rollers 50 which engage the annular recess 51 in a plate 52 mounted at one end of the drum. The recess 51 is eccentric with respect to the axis of rotation of the drum so that when the rings reach a position at 180° from the starting position the rings are withdrawn over the members 48, leaving the blank free to drop out. Any other suitable means might be employed for securing the convenient release of the blanks from the recess into which they are pressed. In order to prevent the rings from rotating on the members 48, the pins 53 are employed, such pins being secured to the rings by means of the studs 54 and extending slidably into holes bored into the drum as indicated in Fig. 4.

The operation of the machine is as follows: After the drum and plunger have been heated from the burners 42 and 43, the rotation of the rollers is started from the drive shaft 13 (Fig. 1) and a mass of glass is poured from a ladle into the space above the rolls. A depending sheet of glass is thus formed and when this sheet passes the plunger 6 the operation of the handle 19 is started. The movement of such handle to the left (Fig. 4) causes the plunger to move into the position indicated in Fig. 3, thus punching out a blank and pressing it into one of the recesses of the drum 8. On the reverse movement of the handle the plunger is withdrawn from the drum, and in such movement the handle first engages the cam 40 (Fig. 2) to cause the disengagement of the nose of the lever 18 from the locking plate 17. Upon a further movement of the handle in the same direction, the bolt 35 engages the right hand end of the slot 34, moving the lever 16 to the right and causing the pawl 29 to rotate the ratchet 14 and drum 8 a quarter of a revolution, bringing a second recess in the drum into alignment with the plunger. On further reciprocations of the handle this operation is repeated. The formation of the blanks may be continued indefinitely, more glass being supplied above the rollers after mass 3 becomes exhausted. As the formation of the sheet is continuous, the glass just above the plunger tends to press upon the plunger and thicken up while the plunger is in the position indicated in Fig. 3, but this action is relatively slight and does not interfere with the successful operation of the machine. A plurality of drums placed side by side may be employed in connection with a corresponding number of plungers, so that the entire width of the sheet may be utilized if desired. The blanks are produced rapidly and accurately at a single operation without the necessity of reheating the glass or of cutting the glass after it has hardened, and the thickness of the sheet may be regulated by adjustment of the roller 2 in and out to suit requirements. The contour of a blank may also be readily changed by substituting other members 48 having their operative faces of a different curvature and by substituting plungers having operative faces of a different contour. The construction of the machine may also be modified widely in the matter of detail, the primary feature of the invention being the generation of a sheet from which blanks are punched into mold recesses at a single operation of the plunger, so that the blanks may be produced complete in the one operation and without any reheating of the glass. While the machine and process are intended for use primarily in the production of spectacle blanks, it will be understood that the invention is not so limited and may be used in the production of a variety of glass blanks or even finished articles, the configuration of the mold and plunger being changed in each case to give the desired shape in the blank or article produced.

What I claim is:

1. The process of producing glass articles which consists in generating a plastic sheet of glass, punching successive articles therefrom with a plunger and continuing the movement of the plunger to carry the articles laterally into a mold to press them to the desired configuration.

2. The process of producing glass articles which consists in generating a plastic sheet of glass, punching successive articles therefrom with a plunger while supporting the sheet surrounding the plunger, and continuing the movement of the plunger to carry the article laterally to a mold and press it into such mold to give it the desired configuration.

3. The process of producing glass articles which consists in continuously generating a plastic sheet of glass, intermittently punching successive articles therefrom with a plunger during the formation of the sheet and continuing the movement of the plunger to carry the article laterally to a mold and press it into such mold and give it the desired configuration.

4. Apparatus for producing glass articles comprising means for generating a sheet of glass, a plunger mounted for movement through the sheet to punch out an article, and a drum mounted for rotation in opposition to the plunger and provided in its periphery with a series of mold recesses adapted to be brought successively into alignment with the plunger to receive the articles punched out by said plunger.

5. Apparatus for producing glass articles comprising means for continuously generating a sheet of glass, a plunger mounted for movement through the sheet to punch out an article, and a mold in alignment with the plunger for receiving the articles.

6. Apparatus for producing glass articles, means for generating a sheet of glass continuously in a downward direction, a plunger mounted beneath said means for movement transversely through the sheet, and a movable mold adapted to be brought into alignment with the plunger and to receive the article punched out of the sheet thereby.

7. Apparatus for producing glass articles, means for generating a sheet of glass continuously in a downward direction, a plunger mounted beneath said means for movement transversely through the sheet, and a series of mold members adapted to be brought successively into alignment with the said plunger and to receive the successive articles punched from the sheet thereby.

8. Apparatus for producing glass articles, means for generating a sheet of glass continuously in a downward direction, a plunger mounted beneath said means for movement transversely through the sheet, and a drum mounted for rotation in opposition to the plunger and provided in its periphery with a series of mold recesses adapted to be brought successively into alignment with said plunger and to receive the articles punched out by said plunger.

9. Apparatus for producing glass articles, means for generating a sheet of glass continuously in a downward direction, a plunger mounted beneath said means for movement transversely through the sheet, and a drum mounted for rotation in opposition to the plunger and provided in its periphery with a series of mold recesses adapted to be brought successively into alignment with said plunger to receive the articles, and means operated by the rotation of the drum for releasing the articles from the recesses.

10. Apparatus for producing glass articles, means for generating a sheet of glass continuously in a downward direction, a plunger mounted beneath said means for movement transversely through the sheet, and a drum mounted for rotation in opposition to the plunger and provided in its periphery with a series of mold recesses adapted to be brought successively into alignment with said plunger to receive the articles, means for continuously operating the rolls and means for intermittently operating the plunger and drum.

In testimony whereof I have hereunto subscribed my name this 26th day of Aug., 1920.

F. GELSTHARP.

Witness:
J. C. PARKINSON.